US005469894A

United States Patent [19]
Gandia et al.

[11] Patent Number: 5,469,894
[45] Date of Patent: Nov. 28, 1995

[54] METAL DUCT SUBJECTED TO STEEP TEMPERATURE GRADIENTS

[75] Inventors: Liberto Gandia, Blevilliers; Frédéric Rouget, Valdoie, both of France

[73] Assignee: European Gas Turbines SA, Paris, France

[21] Appl. No.: 140,393

[22] Filed: Oct. 25, 1993

[30] Foreign Application Priority Data

Oct. 26, 1992 [FR] France .................................. 92 12723

[51] Int. Cl.⁶ .................................................... F16L 9/04
[52] U.S. Cl. ........................... 138/172; 138/177; 138/109
[58] Field of Search ..................................... 138/172, 106, 138/107, 112, 116, 117, 177, DIG. 11, DIG. 4, 109, 111, 113, 148, 149

[56] References Cited

U.S. PATENT DOCUMENTS

| 2,634,759 | 4/1953 | Twickler . | |
|---|---|---|---|
| 3,035,333 | 5/1962 | Baehr | 138/116 |
| 3,687,168 | 8/1972 | Sherman et al. | 138/DIG. 4 |
| 3,714,970 | 2/1973 | Kunsagi | 138/172 |
| 4,077,592 | 3/1978 | Forbes | 138/107 |
| 4,182,378 | 1/1980 | Dieter | 138/112 |
| 4,308,967 | 1/1982 | Vater et al. | 138/172 |
| 4,327,473 | 5/1982 | Somerville | 138/172 |
| 4,974,638 | 12/1990 | Gastebois et al. | 138/113 |
| 5,253,901 | 10/1993 | Hunter | 138/172 |

FOREIGN PATENT DOCUMENTS

| 1456866 | 9/1966 | France . |
| 2089434 | 6/1982 | United Kingdom . |

*Primary Examiner*—David Scherbel
*Assistant Examiner*—James F. Hook
*Attorney, Agent, or Firm*—Sughrue, Mion, Zinn, Macpeak & Seas

[57] ABSTRACT

The present invention relates to a metal duct, the inside of which is subjected to steep temperature gradients, and which includes a sheet metal tube of rectangular crosssection with rounded corners and reinforced with outer stiffeners constituted by members which are disposed in planes perpendicular to the axis of symmetry of the tube and which are connected thereto. The stiffening members are constituted by rectilinear first members welded to the sides of the tube and interconnected at each corner via a respective second member which is secured via its ends to two adjacent first members, the second member being spaced apart from the duct. The duct is designed, in particular, to form a gas turbine exhaust duct.

6 Claims, 1 Drawing Sheet

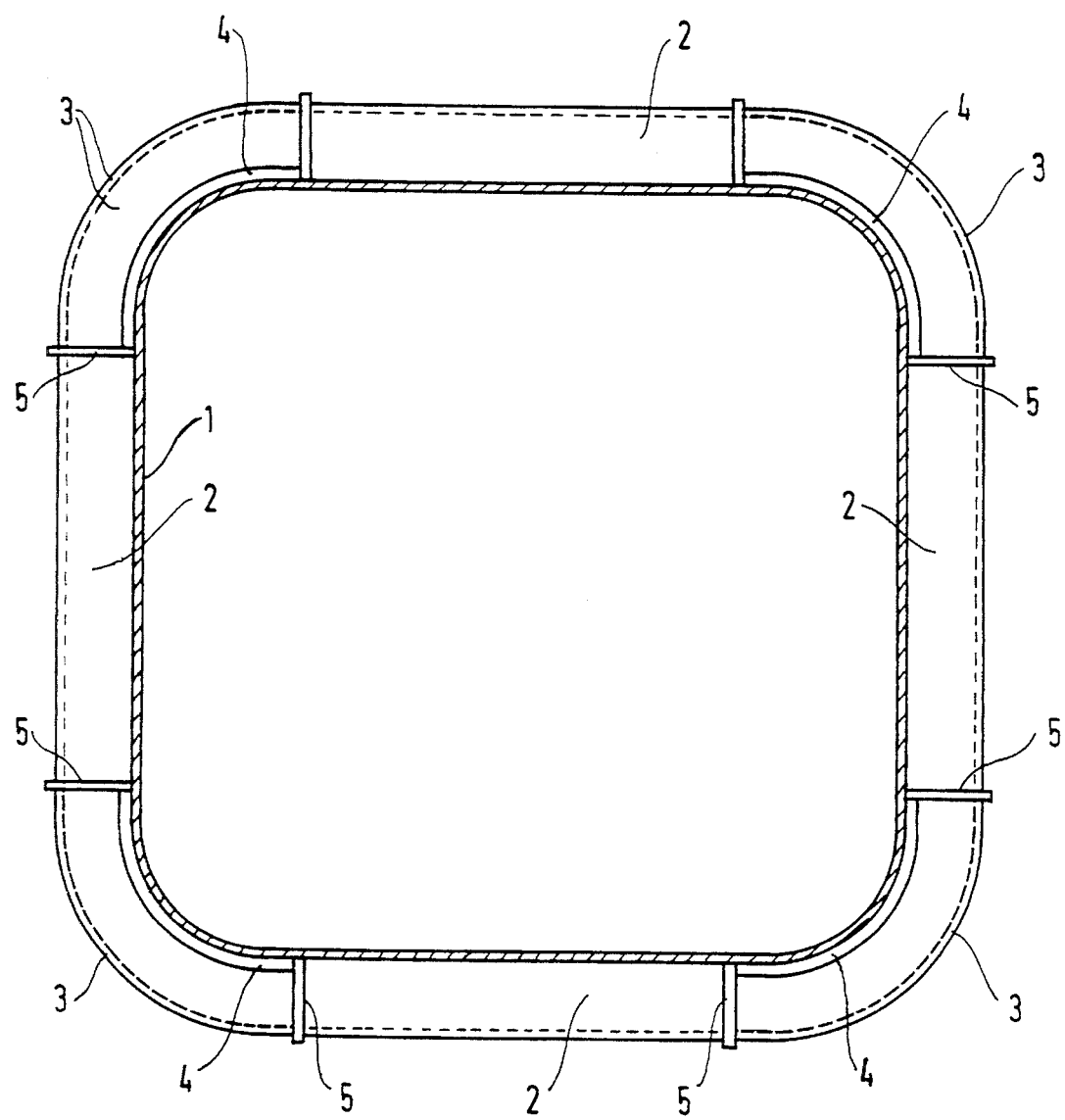

METAL DUCT SUBJECTED TO STEEP TEMPERATURE GRADIENTS

The present invention relates to a metal duct subjected to steep temperature gradients, and concerns in particular a gas turbine exhaust duct.

BACKGROUND OF THE INVENTION

More precisely, it concerns a metal duct, the inside of which is subjected to steep temperature gradients, and which comprises a sheet metal tube of rectangular cross-section with rounded corners and reinforced with outer stiffeners constituted by members which are disposed in planes perpendicular to the axis of symmetry of the tube and which are connected thereto.

Conventionally, the tube is rectangular, or preferably square, in cross-section, with rounded corners so as to limit the stresses where they are at their maximum levels. The stiffening members which provide mechanical strength are constituted by members welded around the entire periphery of the sheet metal tube. Since the duct is subjected to steep temperature gradients, those faces of the stiffening members which are welded to the tube heat up very quickly while their outside portions are still at low temperatures. The differences in temperature on either side of the web of each of the members generate thermal stresses linked to the resulting differential expansion. At the corners, where the values of conventional mechanical stresses are at their maximum levels, the addition of the differential thermal stresses often causes the performance levels of the materials to be exceeded. As a result the stiffening members crack and more seriously the tube tears, and there is then a danger that leaks of the very hot medium being conveyed will occur, and that the damage will be made worse.

A known solution consists in lagging the outside of the stiffening members so as to limit the flow of heat through the duct sections and therefore the thermal differentials, but the inertia of the masses of the ducts considerably limits the performance levels of that solution.

Another known solution is to limit the height of the stiffening members so as to reduce the temperature difference between their bases and their tops, thereby requiring the stiffening pitch to be increased so as to retain the mechanical characteristics. This is not economically advantageous, and limits only the problem of fixing of the stiffening members, without guaranteeing the sealing strength of the ducts.

OBJECTS AND SUMMARY OF THE INVENTION

An object of the present invention is to solve those problems by means of a particularly simple system of stiffening members.

To this end, according to the invention, the stiffening members are constituted by rectilinear first members welded to the sides of the tube and interconnected at each corner via a respective second member which is secured via its ends to two adjacent first members, the second member being spaced apart from the duct.

The invention therefore aims to dissociate the stiffening members from the tube at the corners of the duct. Both faces of the second member, and in particular the face facing the tube are insulated by respective layers of air, thereby limiting the flow of heat to a much greater extent than any external insulation. In this way, the maximum temperature difference between the bases and tops is considerably reduced.

If the residual constraints are still too great relative to the performance levels of the materials, the cracks in the corner stiffening members will not be able to propagate and reach the tube. In this way, the tube will remain fluid-tight, thereby avoiding any worsening of the damage, such as the lagging being destroyed, the stiffeners being at too high a temperature, the stiffeners breaking, etc.

Preferably, each second member is welded to the adjacent first members.

Advantageously, each second member has a rounded shape that matches the shape of each of the corners of the tube, the clearance between the second member and the tube being substantially constant.

The invention also concerns a gas turbine exhaust duct constituted by a duct such as the duct described above.

Such ducts are, in general, made of refractory steel and are subjected to sudden variations in temperature due to the gas turbine being started up quickly. The gastightness of the tube is essential, regardless of whether or not the tube is insulated from the gas.

BRIEF DESCRIPTION OF THE DRAWING

A preferred embodiment of the invention is described below in more detail with reference to the accompanying drawing, in which:

the sole figure is a view in cross-section through a duct of the invention.

MORE DETAILED DESCRIPTION

The duct is constituted by a sheet metal tube 1 of rectangular or preferably square cross-section having rounded corners. Stiffeners are disposed around the periphery of the tube, and at a pitch determined by its mechanical strength. The stiffeners comprise first members 2 that are preferably channel-section and that are welded to the sides of the tube 1, and second members 3 that are preferably channel-section, but that may be I-section, and that are connected via their ends to two adjacent first members 2. Preferably, the second members 3 are welded to the first members 2 via respective plates 5 welded to the ends of the first members 2.

There is a substantially constant amount of clearance 4 between the second members 3 and the tube 1, the shape of second members being rounded to match the shape of the corners of the tube 1. The clearance 4 enables an insulating layer of air to be created, and the absence of contact between the tube 1 and the second members 3 prevents any cracks in the members 3 subjected to the thermal stresses from being transmitted to the tube 1.

We claim:

1. A metal duct subjected to steep temperature gradients comprising:

a sheet metal tube substantially rectangular in cross-section with four flat sides and four rounded corners; and outer stiffeners disposed in separate discrete planes substantially perpendicular to a longitudinal axis of said tube, said outer stiffeners comprising four rectilinear first members, each of said first members being welded along a respective one of said four flat sides, and four second members, each of said second members being mounted between adjacent ends of said first members around a respective one of the rounded corners and spaced a predetermined distance from the rounded corners so as not to contact the rounded corners.

2. A duct according to claim 1, wherein said second members are welded to the adjacent ends of said first members.

3. A duct according to claim 1, wherein a curvature of each of said second members is substantially the same as a curvature of the rounded corners so that the predetermined distance between each of the second members and the rounded corners is substantially constant.

4. A gas turbine exhaust duct comprising:

a sheet metal tube substantially rectangular in cross-section with four flat sides and four rounded corners; and outer stiffeners disposed in separate discrete planes substantially perpendicular to a longitudinal axis of said tube, said outer stiffeners comprising four rectilinear first members, each of said first members being welded along a respective one of said four flat sides, and four second members, each of said second members being mounted between adjacent ends of said first members around a respective one of the rounded corners and spaced a predetermined distance from the rounded corners so as not to contact the rounded corners.

5. A gas turbine exhaust duct according to claim 4, wherein said second members are welded to the adjacent ends of said first members.

6. A gas turbine exhaust duct according to claim 4 wherein a curvature of each of said second members is substantially the same as a curvature of the rounded corners so that the predetermined distance between each of the second members and the rounded corners is substantially constant.

* * * * *